US006440048B1

(12) United States Patent
Bleil et al.

(10) Patent No.: US 6,440,048 B1
(45) Date of Patent: Aug. 27, 2002

(54) LOW COST FUSER ROLLERS

(75) Inventors: Rainer J. Bleil, Rochester; Allen Kass, Pittsford, both of NY (US); Karsten Uekert, Muehlhausen (DE)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,191

(22) Filed: Dec. 31, 1998

(51) Int. Cl.[7] .......................... B21K 1/00; F16C 13/00; F16C 35/08

(52) U.S. Cl. ..................... 492/46; 29/895.2; 29/895.21; 29/895.22; 492/47; 492/59; 399/330; 464/184; 228/112.1; 432/66

(58) Field of Search ........................... 29/895.2, 895.22, 29/895.21; 492/18, 25, 46, 77, 45, 59; 165/89; 399/330, 331; 432/66; 464/184; 228/112.1, 114.5

(56) References Cited

U.S. PATENT DOCUMENTS

| | | | | | |
|---|---|---|---|---|---|
| 4,252,587 | A | * | 2/1981 | Harden et al. | 228/112.1 |
| 4,718,154 | A | * | 1/1988 | Bauer | |
| 5,649,891 | A | * | 7/1997 | Kass et al. | |
| 5,659,866 | A | * | 8/1997 | Kim | |
| 5,726,425 | A | * | 3/1998 | Moebis | |
| 5,821,499 | A | * | 10/1998 | Crimmins et al. | |
| 5,845,173 | A | * | 12/1998 | Zogg et al. | |
| 5,987,296 | A | * | 11/1999 | Shimada et al. | |

FOREIGN PATENT DOCUMENTS

| | | | | |
|---|---|---|---|---|
| JP | 57-058989 | * | 4/1982 | 228/114.5 |

* cited by examiner

*Primary Examiner*—I Cuda-Rosenbaum
*Assistant Examiner*—Eric Compton
(74) *Attorney, Agent, or Firm*—Chris P. Konkol

(57) ABSTRACT

A fixing apparatus for electrostatographic reproduction or digital printing comprising: (a) a core (b) a gudgeon friction welded to said core, the gudgeon consisting of through slots or holes in a shoulder of said gudgeon.

7 Claims, 4 Drawing Sheets

LOW COST FUSER ROLLERS

FIELD OF THE INVENTION

The invention is related to large diameter heater rollers and specifically to the gudgeons and insulating sleeves that are parts of the heated roller assembly.

BACKGROUND OF THE INVENTION

In the printing industries, heated rollers are commonly used to feed paper and also for electrostatographical machines serve as a fuser roller to fuse toner onto paper. The toner may be black or multicolor for color printing and copying. In such applications, as fuser rollers, the roller is supposted by gudgeons, also referred to as end caps, which are inserted into bearings, and the roller is typically rotated by a drive source connected to one of the gudgeons. The fusing of the toner requires typical temperatures of 300 to 400 degrees F. Fusing of the toner requires high pressure and therefore the fuser roller is engaged with another roller, typically called a pressure roller. When the two rollers are engaged, the elastomers on both rollers are compressed and the width of the compressed zone is generally known as nip width. In certain applications where image quality and high throughput are critical, large diameter fuser rollers are required. Large diameter fuser rollers are in excess of 4 inches in diameter and range from four to ten inch diameter, with a typical diameter of 6.4 inches. For precise controlling of the fusing temperature, heat loss through the gudgeons must be effectively minimized, through the proper material selection, bearing insulating sleeves and roller design.

Typically, metal gudgeons in conjunction with plastic insulating sleeves are used in fuser roller construction. The preferred gudgeon material is powder metal ( U.S. Pat. No. 5,094,613) due to lower thermal conductivity and near net shape manufacturing capability. The material selection is stainless steel (type 303, 304 or 316 stainless steel) although mild steel may also be used. The preferred method to assemble gudgeons to the core is by friction welding, due to the fact that the joint is permanent, capable of achieving tight tolerances and the process is extremely reliable. Other methods can be used such as press fits and bolt on designs which tend to be more costly and tend to be not as reliable. With large diameter fuser rollers, the length of the outside gudgeon diameter must be extended so that there is enough engagement for friction welding. The outside gudgeon diameter is required for engagement for friction welding due to the fact that extreme forces are generated during welding. If the small diameter was engaged, the gudgeon would fracture as a result of the welding process. As a result, in the manufacture of large diameter fuser rollers, the gudgeons are extremely expensive due to the excess material required for engagement for friction welding. In addition, machining this welded fuser roll assembly is costly due to extensive machining required due to the extra material.

A patent and literature search uncovered a Research Disclosure (No. 33279, Dec. 1991, see Attachment A), where in a heated roller (with possibly a large fusing diameter) having an extrusion profile of concentric circles connected with spokes. The gudgeons would be welded to the inner circle of the core resulting in reduced cost due to the reduced size of the gudgeon. The major problem with this design concept is that heat transfer through the spokes is inefficient and would not be suitable for a high output printer or copier. What is needed in the art is a low cost design for large diameter fuser rollers where thermal transfer through the gudgeons and the bearings are minimized.

SUMMARY OF THE INVENTION

The object of the present invention is to provide a heated roller, such as in a electrostatographic reproduction apparatus, which has a low design cost, which is suitable for large diameter fuser rollers, and in which thermal transfer through the gudgeons and the bearing are minimized. The gudgeon of the invention has slots, holes or similar configurations that serve for engagement during the friction welding process. The result is a significant reduction in unit manufacturing cost for the fuser roll assembly. In addition, the insulator sleeve is designed to fit between the gudgeon bearing diameter and the inside diameter of the bearing. The sleeve is designed so that there is engagement with the slots in the gudgeon so that the sleeve does not rotate when assembled to the fuser roller.

DETAIL DESCRIPTION OF THE INVENTION

Figure 1A:
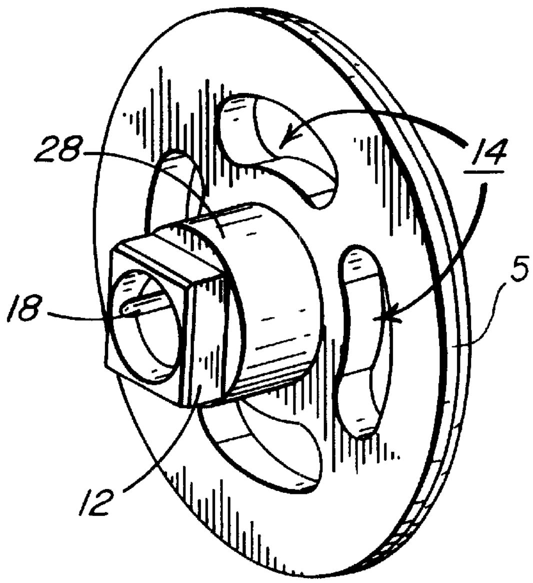
FIG. 1 shows the side view, cross-sectional view and isometric view of the gudgeon of the invention (10) prior to friction welding.
Figure 1B:
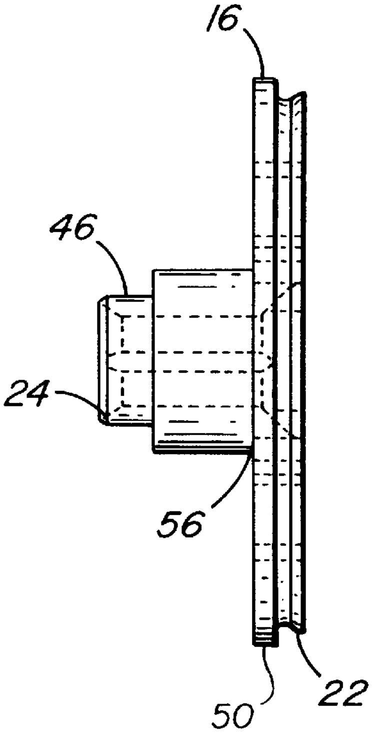
Figure 1C:
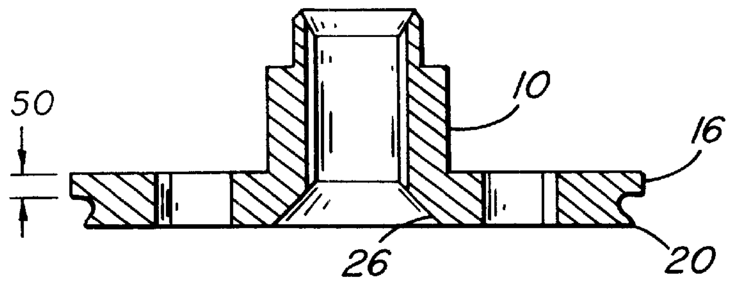
Figure 2A:
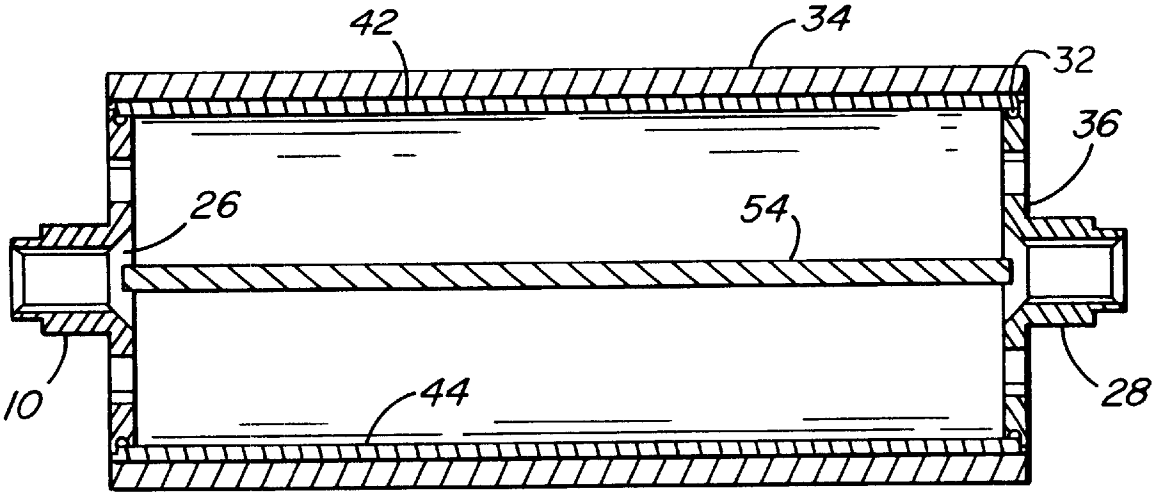
FIG. 2 shows the side view, cross-sectional view and isometric view of the coated fuser roller assembly after friction welding and machining.
Figure 2B:
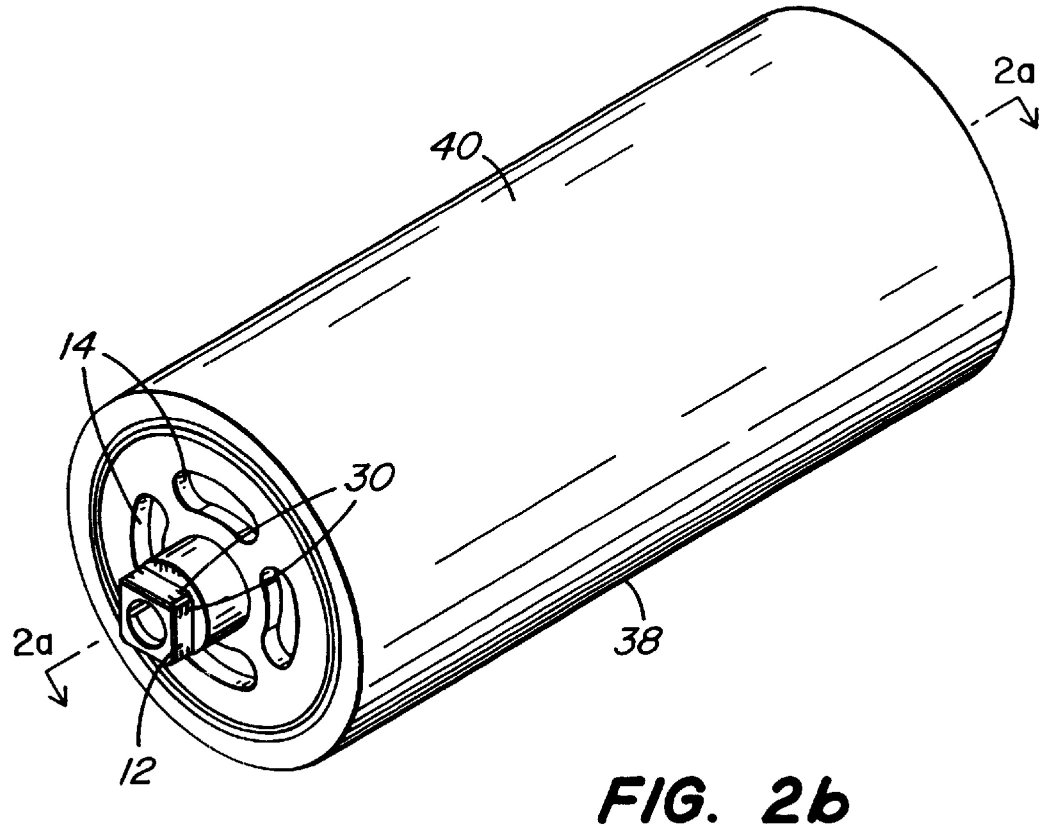

Referring to FIGS. 1 and 2, this invention applies to fuser rollers of outside diameter (40) greater than four inches. The action range of diameters would be from four to ten inches with a typical diameter of 6.4 inches. The main feature of this invention is that through slots (through the wall thickness) or blind slots (14), not through holes, are employed. The blind or through holes could be of any shape such as round, oval, square, etc. and these holes would be used for engagement for friction welding. The main advantage is that length (50) of the upset diameter (16) would vary from 0.075 to 0.250 inch with a typical length of 0.210 inch. If conventional friction welding was utilized, the length of the upset diameter would vary from 0.800 to 1.0 inches with a typical length of 0.890 inches. The result is that the weight of the gudgeons is significantly reduced resulting in less than half the cost to manufacture the gudgeons. In addition, significantly less machining is required after the parts are friction welded. The machining cost is reduced 25–50%.

Another advantage of having slots in the gudgeons is that thermal heat transfer through the gudgeons would be reduced due to the reduction in cross sectional area through which heat would be conducted. In addition, the reduced weight allows for better performance in that less torque would be required for rotation during fusing. Another advantage is that the slots reduce the required compacting load needed in order to fabricate the gudgeon using powder metal technology. Indeed, without the slots, the gudgeon probably could not be fabricated out of powder metallurgy since the gudgeons with the slots would utilize the largest powder metal press available.

The preferred material to fabricate the gudgeons is 300 series stainless steel (typically AISI type 303, 304 or 316). The preferred manufacturing method is powder metallurgy due to its low cost, corrosion resistance and low thermal conductivity (U.S. Pat. No 5,094,613). The gudgeon may also be manufactured from machining wrought bar stock, casting or by powder metal injection molding. The gudgeons may also be manufactured from two pieces of wrought or powder metal if it is deemed to be more economical to do so. Typically, the weld joint would occur (56) where the bearing and upset diameters are joined.

The gudgeon to core bond is obtained by upsetting the inside core diameter (44) with the upset diameter (16) on the gudgeon. The upset material is forged or flowed into the dovetail in the gudgeon (20) which insures a permanent bond. In addition, the aluminum flows into the dovetail at approximately 800 degrees F. which shrinks onto the stainless steel gudgeons at room temperature. Therefore, essentially, a press fit is obtained to insure one gets a permanent bond. The gudgeon dovetail diameter (22) should be smaller than the core inside diameter (44).

The 90 degree angle (26) makes it easy to replace the fuser roll lamp (54). The gudgeon's indents (18) are required for driving the roller during machining. Other configurations like an hexagonal may also be used. The chamfer (24) is required for manufacturing, such as turning the core, coating and molding the elastomer and grinding. The square (12) on the gudgeon is used for engagement with the gear (62) for rotational motion engagement. Other shapes may also be used for engagement such as a D-shape or two parallel flats. The depth or length of the square (46) approximates the thickness of the gear. The bearing diameter (28) fits inside the insulating sleeve inside diameter (52). The insulating sleeve is used to reduce the temperature to the bearing (28). The sleeve is generally made from a high temperature plastic like Torlon 2301L. The sleeve is prevented from rotating by engaging the sleeve projection (48) into the gudgeon slots (14). Elimination of the sleeve rotating improves the life of the sleeve and also noise associated with the rotation. The insulating sleeve could be made into two pieces if it was deemed to be made more economical. If two pieces were made, the face (58) material could be made from plastic or metal, but would be designed so that the two sections are locked together to prevent rotation of the sleeve under the bearing (64).

The fuser roll assembly consists of a core (32) which is made from a thermally conductive material like aluminum or copper and an elastomeric coating (34) which does the actual fusing of toner. The gudgeon shoulder (36) defines where the insulating sleeve stops during assembly and thereby defines location of bearings. The retaining ring slots retains the bearing, gear and insulating sleeve from sliding off the gudgeon.

Figure 3A:
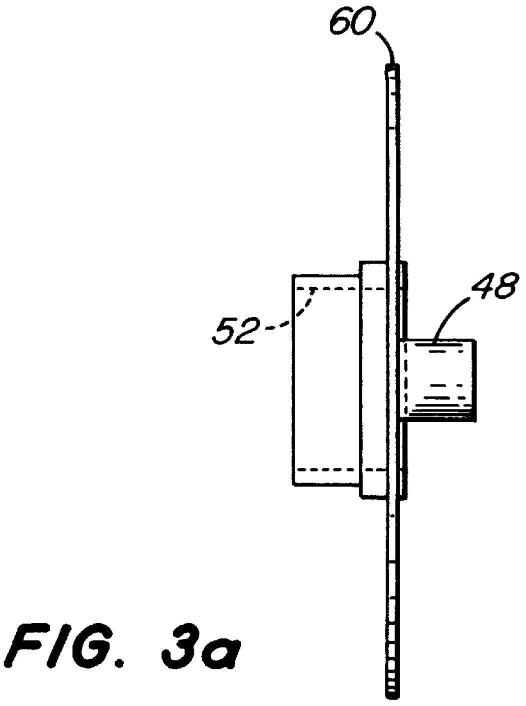
FIG. 3 shows the side view, cross-sectional view and isometric view of the insulating sleeve that is assembled onto the coated fuser roller assembly.
Figure 3B:
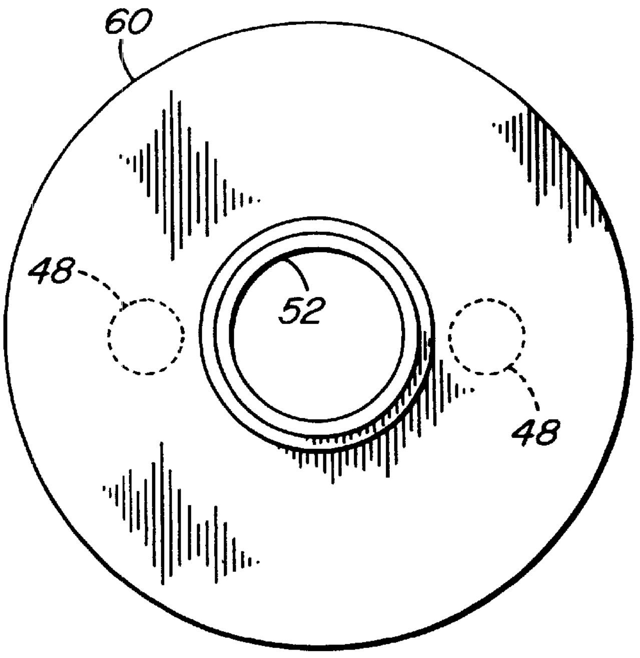
Figure 4A:
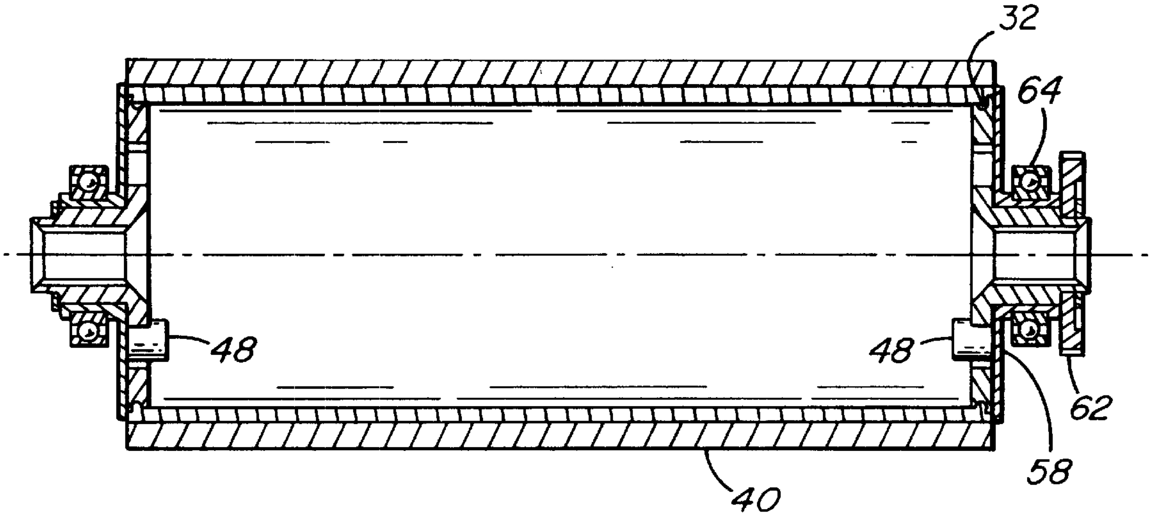
FIG. 4 the fuser roller assembly with the insulating sleeve, bearing, and drive gear.
Figure 4B:
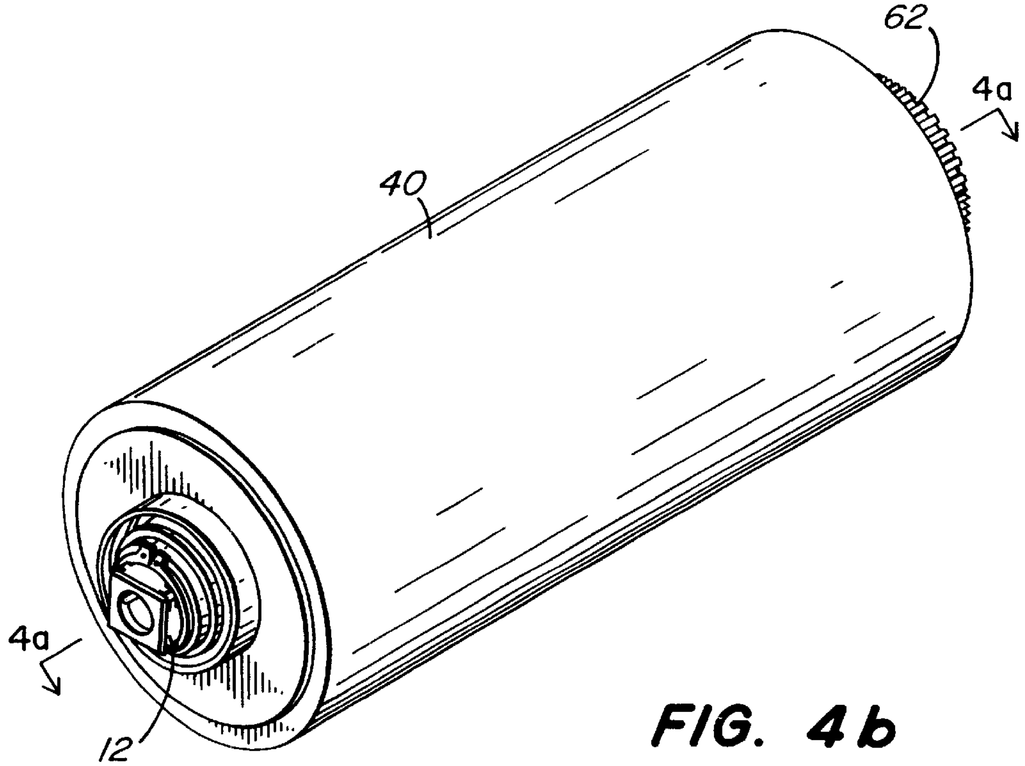

FIGS. 3 and 4 describe the insulating sleeve and the coated fuser roll assembly with the insulating sleeve, bearings and gear. The sleeve material could be Vesbel™, Torlon™, or Aurum™. The plastic must withstand a maximum operating temperature up to 500 degrees F. The utilization of an insulating sleeve is conventional. The unique aspect of the sleeve is the use of slots in the gudgeons as a locking device to prevent rotation.

The invention has been described in detail with particular reference to certain preferred embodiments thereof, but it will be understood that variations and modifications can be effected within the spirit and scope of the invention.

PARTS LISTS

10 gudgeon
12 square on gudgeon for driving roller
14 slots for friction or inertia welding
16 diameter on gudgeon for upsetting during friction welding
18 indent for machining
20 dovetail for friction welding joint
22 diameter below dovetail to clear inside tube diameter
24 chamfer for machining
26 chamfer for assembling lamp
28 bearing diameter
30 retaining ring grooves
32 fuser roll core
34 elastomer fuser coating
36 shoulder of gudgeon
38 length of fuser roller
40 overall fuser roll diameter with rubber
42 outside diameter of fuser roll core
44 inside diameter of fuser roll core
46 length of square
48 projections on insulating sleeve
50 length of large diameter
52 inside diameter of insulating sleeve
54 lamp for heating fuser roll
56 potential weld joint
58 insulator sleeve face
60 outside sleeve diameter
62 gear
64 bearing

What is claimed is:

1. A fixing apparatus for electrostatographic reproduction or digital printing comprising a fuser member having an outside diameter of 4 to 10 inches, which fuser member comprises: (a) a thermally conductive core comprising aluminum or copper and an elastomeric coating and (b) a stainless steel gudgeon that is friction welded to said core, the gudgeon comprising means for reducing heat transfer through the gudgeon during use and for enabling engagement for welding, and in locking engagement with (c) an insulating sleeve.

2. The fixing apparatus of claim 1, wherein said means are in the form of slots or holes, in a shoulder of said gudgeon.

3. A fuser member having an outside diameter of 4 to 10 inches for electrostatographic reproduction or digital printing comprising: (a) a thermally conductive core comprising aluminum or copper and an elastomeric coating, and (b) stainless steel gudgeon, made from molded powder metal or from cast or machined bar stock, that is friction welded to said core, which gudgeon comprises a shoulder having means for reducing heat transfer through the gudgeon during use, enabling engagement for welding, and providing locking engagement with (c) an insulating sleeve.

4. The fuser member of claim 3, having an outside diameter of about 6.4 inches.

5. The fuser member of claim 3, wherein said means are in the form of slots or holes.

6. A method of making a fuser member having an outside diameter of 4 to 10 inches, which method comprises the steps of:

providing a thermally conductive core comprising aluminum or copper and an elastomeric coating, friction welding a stainless steel gudgeon to the core, the gudgeon having a shoulder with means for reducing heat transfer through the gudgeon during use and for engagement during welding; and engaging the means with projections in an insulating sleeve thereby locking together the gudgeon and sleeve.

7. The method of claim 6, wherein said means are in the form of slots or holes.

* * * * *